United States Patent
Kawagishi et al.

(10) Patent No.: US 12,527,801 B2
(45) Date of Patent: Jan. 20, 2026

(54) CELL ACTIVATOR OF ANIMAL CELL

(71) Applicants: Vitamin C60 BioResearch Corporation, Tokyo (JP); NATIONAL UNIVERSITY CORPORATION SHIZUOKA UNIVERSITY, Shizuoka (JP)

(72) Inventors: Hirokazu Kawagishi, Shizuoka (JP); Hisae Aoshima, Tokyo (JP)

(73) Assignees: Vitamin C60 BioResearch Corporation (JP); NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 1087 days.

(21) Appl. No.: 17/615,122

(22) PCT Filed: Jun. 2, 2020

(86) PCT No.: PCT/JP2020/021787
§ 371 (c)(1),
(2) Date: Nov. 30, 2021

(87) PCT Pub. No.: WO2020/246468
PCT Pub. Date: Dec. 10, 2020

(65) Prior Publication Data
US 2022/0233547 A1    Jul. 28, 2022

(30) Foreign Application Priority Data

Jun. 6, 2019   (JP) .................. 2019-106031

(51) Int. Cl.
| | | |
|---|---|---|
| *A61K 31/53* | (2006.01) | |
| *A61K 8/49* | (2006.01) | |
| *A61P 17/16* | (2006.01) | |
| *A61Q 19/00* | (2006.01) | |
| *A61Q 19/02* | (2006.01) | |
| *A61Q 19/08* | (2006.01) | |
| *C12N 5/071* | (2010.01) | |

(52) U.S. Cl.
CPC ............ *A61K 31/53* (2013.01); *A61K 8/4966* (2013.01); *A61P 17/16* (2018.01); *A61Q 19/007* (2013.01); *A61Q 19/02* (2013.01); *A61Q 19/08* (2013.01); *C12N 5/0629* (2013.01); *C12N 2501/999* (2013.01)

(58) Field of Classification Search
CPC ....... A61K 31/53; A61K 8/4966; A61P 17/16; A61Q 19/007; A61Q 19/02; A61Q 19/08; C12N 5/0629; C12N 2501/999
See application file for complete search history.

(56) References Cited

U.S. PATENT DOCUMENTS

2014/0148598 A1*  5/2014  Kawagishi ........... C07D 487/04
435/119

FOREIGN PATENT DOCUMENTS

| CN | 103649092 A | 3/2014 |
|---|---|---|
| EP | 2703403 A1 | 3/2014 |
| JP | 63-068570 | 3/1988 |
| JP | 63-104965 | 5/1988 |
| JP | 04-210680 | 7/1992 |
| JP | 2009-001558 | 1/2009 |
| JP | 4565018 | 10/2010 |
| JP | 2011-148742 A | 8/2011 |
| JP | 2013-194008 A | 9/2013 |
| JP | 2016-037470 A | 3/2016 |
| WO | WO 2011/010695 | 1/2011 |
| WO | WO 2012/147750 A1 | 11/2012 |
| WO | WO 2015/015816 A1 | 2/2015 |
| WO | WO 2016/136508 A1 | 9/2016 |
| WO | WO 2019/172268 A1 | 9/2019 |

OTHER PUBLICATIONS

Yousef H, Alhajj M, Fakoya AO, Sharma S. Anatomy, Skin (Integument), Epidermis. Jun. 8, 2024. In: StatPearls [Internet]. Treasure Island (FL): StatPearls Publishing; Jan. 2025—. PMID: 29262154, pp. 1-16. (Year: 2025).*
Sarian, Murni Nazira; Zulkefli, Nabilah; Zain, Shazeli; Maniam, Sandra; and Fakurazi, Sharida (2023) "A review with updated perspectives on in vitro and in vivo wound healing models," Turkish Journal of Biology: vol. 47: No. 4, Article 3. https://doi.org/10.55730/1300-0152.2659, pp. 236-246. (Year: 2023).*
Ma, Chaoyong. "Animal Models of Disease." Modern Drug Discovery, Jun. 2004, pp. 30-36. (Year: 2004).*
Cheresan, Rasma. "Chapter 8: Bioavailability, Bioequivalence, and Drug Selection." Basic Pharmacokinetics, 1996, p. 8-17. (Year: 1196).*
Michael Dourson, Lorna Ewart, Suzanne C Fitzpatrick, Silvia B M Barros, Brinda Mahadevan, A Wallace Hayes, The Future of Uncertainty Factors With In Vitro Studies Using Human Cells, Toxicological Sciences, vol. 186, Issue 1, Mar. 2022, pp. 12-17. (Year: 2022).*
Ashikaga et al. "Development of an in vitro skin sensitization test using human cell lines: The human Cell Line Activation Test (h-CLAT) I. Optimization of the h-CLAT protocol." Toxicology in Vitro, 2006, 20: 767-773. (Year: 2006).*
Rosenfeld, Simon. "Do DNA Microarrays Tell the Story of Gene Expression?" Gene Regulation and Systems Biology, 2010, 4: 61-73 (Year: 2010).*
Mason, Emma. "Assessing Cell Proliferation." Biocompare: The Buyer's Guide for Life Scientists. Dec. 13, 2018, pp. 1-8. (Year: 2018).*
Cleveland Clinic. "Wrinkles." Retrieved on Apr. 22, 2025. Retrieved from internet <URL: https://my.clevelandclinic.org/health/diseases/10984-wrinkles>; pp. 1-15. (Year: 2025).*
Healthline. "8 Proven Ways to Prevent Wrinkles." Retrieved on May 2, 2025. Retrieved from internet <URL:https://www.healthline.com/health/skin/how-to-prevent-wrinkles#:~:text=Takeaway,with your doctor or dermatologist; p. 1. (Year: 2025).*

(Continued)

*Primary Examiner* — Doan T Phan
(74) *Attorney, Agent, or Firm* — OSTROLENK FABER LLP

(57) ABSTRACT

A cell activator of an animal cell that includes 3H-imidazo[4,5-d][1,2,3]triazine-4,6(5H,7H)-dione.

8 Claims, No Drawings

(56) References Cited

OTHER PUBLICATIONS

Matin T, Patel P, Goodman MB. Benzoyl Peroxide. [Updated Mar. 1, 2024]. In: StatPearls [Internet]. Treasure Island (FL): StatPearls Publishing; Jan. 2025—. Available from: https://www.ncbi.nlm.nih.gov/books/NBK537220/; pp. 1-9. (Year: 2025).*

Buraczewska et al. "Long-term treatment with moisturizers affects the mRNA levels of genes involved in keratinocytes differentiation and desquamation." Arch Dermatol Res, 2009, 301: 175-181. (Year: 2009).*

Shanks et al. Review: Are animal models predictive for humans.' Philosophy, Ethics, and Humanities in Medicine, 2009, 4(2); pp. 1-20. (Year: 2009).*

Park et al. "Substance P Stimulates Endothelin 1 Secretion via Endothelin-Converting Enzyme 1 and Promotes Melanogenesis in Human Melanocytes." Journal of Investigative Dermatology, 2015, 135: 551-559. (Year: 2015).*

English translation of the International Preliminary Report on Patentability (IPRP) (Chapter 1) mailed Dec. 16, 2021 with a Notification from the International Bureau (Form PCT/IB/338) in corresponding PCT International Application No. PCT/JP2020/021787.

Extended European Search Report dated Jan. 4, 2023 issued in corresponding European Patent Application No. 20818974.6.

Yasin Zaliyatun A.M. et al.: "The Importance of Some Plant Extracts as Skin Anti-aging Resources: A Review", *Current Pharmaceutical Biotechnology*, 2017, vol. 18, No. 11, pp. 864-876, XP055795924, ISSN: 1389-2010.

Hirokazu Kawagishi: "Fairy chemicals—a candidate for a new family of plant hormones and possibility of practical use in agriculture", *Bioscience, Biotechnology, and Biochemistry*, 2018, vol. 82, No. 5, pp. 752-758, https://doi.org/10.1080/09168451.2018.1445523.

International Search Report mailed Aug. 18, 2020 in corresponding PCT International Application No. PCT/JP2020/021787.

Written Opinion mailed Aug. 18, 2020 in corresponding PCT International Application No. PCT/JP2020/021787.

J.H. Choi et al., "Bioconversion of AHX to AOH by resting cells of *Burkholderia* contaminans CH-1," Bioscience, Biotechnology, and Biochemistry, 2016, vol. 80, No. 10, pp. 2045-2050.

T. Suzuki et al., "The biosynthetic pathway of 2-azahypoxanthine in fairy-ring forming fungus," Scientific Reports, vol. 6, No. 39087, Dec. 19, 2016, pp. 1-10.

English translation of the International Preliminary Report on Patentability (Chapter I) mailed Nov. 28, 2013, with a Notification from the International Bureau (Form PCT/IB/338) issued in International Application No. PCT/JP2012/060989.

George A. Ivanovics et al.: "The Synthesis of 2-substituted derivatives of 5-amino-1-.beta.-D-ribofuranosylimidazole-4-carboxamide. Ring opening reactions of 2-azapurine nucleosides", J. Org. Chem., vol. 39, 1974, pp. 3651-3654.

Elliot Shaw et al.: "Imidazo-1,2,3-Triazines as Substrates and Inhibitors for Xanthine Oxidase", J. Biol. Chem. vol. 194, 1952, pp. 641-654.

* cited by examiner

US 12,527,801 B2

CELL ACTIVATOR OF ANIMAL CELL

CROSS-REFERENCE TO RELATED APPLICATIONS

The present application is a 35 U.S.C. §§ 371 national phase conversion of International Application No. PCT/JP2020/021787, filed Jun. 2, 2020, which claims priority to Japanese Patent Application No. 2019-106031, filed Jun. 6, 2019, the contents of both of which are incorporated herein by reference. The PCT International Application was published in the Japanese language.

TECHNICAL FIELD

The present invention relates to a cell activator of an animal cell.

BACKGROUND ART

The skin is a tissue composed of the epidermis and the dermis, and functions as a barrier to protect the body from physical and chemical stress from the outside world. The epidermis and dermis are separated by the basal membrane, and the epidermis is in contact with the outside world. The epidermis is composed of four layers, which are the stratum basale, stratum spinosum, stratum granulosum, and stratum corneum from the basal membrane side, and is mainly composed of epidermal keratinocytes (keratinocytes). Epidermal keratinocytes that have divided in the stratum basale migrate to the outer layer through differentiation and maturation, reach the stratum corneum that is the outermost layer, and then shed, and turnover is repeated. The epidermis has a barrier function due to the stratum corneum that is the outermost layer and a barrier function due to the tight junction of the stratum granulosum on the inner side of the stratum corneum. The turnover of the epidermis is involved in the barrier function of the skin, the retention of water content, and the like. Accordingly, when the turnover of differentiation, maturation, migration, and shedding of the epidermal keratinocytes is slowed due to aging or external stress, this causes rough skin, dry skin, and the like.

In the dermis, which is on the inner side of the epidermis, capillary blood vessels, secretory glands (sweat gland, sebaceous gland), hair follicles, and nerves are present, and the dermis plays a role of nourishing the epidermis and receiving information from the epidermis. The dermis is divided into a papillary layer and a reticular layer. In the reticular layer, which occupies the greater part of the dermis, collagen fibers form dense stitches, accompanied by an elastic fiber network. By the combination of collagen fibers and elastic fibers, strength, ease of stretching, and elasticity are imparted to the skin. Between the fiber bundles, fibroblasts, which produce collagen fibers and elastic fibers, macrophages, mast cells, plasma cells, dermal dendritic cells, and the like are present. The dermis comprises a gel-like ground substance, and proteoglycans (hyaluronic acid, chondroitin sulfate, dermatan sulfate, and the like), proteins, and minerals are present therein. Proteoglycans have a binding ability with respect to water.

Conventionally, in the fields of skin cosmetic products and skin pharmaceutical products, many studies have been conducted to activate skin cells themselves to cause improvement of skin symptoms and an anti-inflammatory effect or wound treating effect, and various skin cell activators have been provided (for example, Patent Literature 1 to Patent Literature 4).

CITATION LIST

Patent Literature

[Patent Literature 1] Japanese Unexamined Patent Publication No. 2011-148742
[Patent Literature 2] Japanese Unexamined Patent Publication No. 2013-194008
[Patent Literature 3] PCT International Publication No. WO2015/015816
[Patent Literature 4] Japanese Unexamined Patent Publication No. 2016-37470

SUMMARY OF INVENTION

Technical Problem

An object of the present invention is to provide a novel cell activator capable of activating animal cells, particularly skin cells.

Solution to Problem

As a result of diligent studies by the inventors of the present invention in order to achieve the above-mentioned object, they have found that 3H-imidazo[4,5-d][1,2,3]triazine-4,6(5H,7H)-dione (alternative term: 2-aza-8-oxo-hypoxanthine, hereinafter, sometimes referred to as "AOH") has an action of activating animal cells, particularly skin cells.

That is, the present invention is as follows.

[1] A cell activator of an animal cell comprising 3H-imidazo[4,5-d][1,2,3]triazine-4,6(5H,7H)-dione.
[2] The cell activator according to [1], wherein the animal cell is a skin cell.
[3] The cell activator according to [2], wherein the cell activator is at least one selected from the group consisting of skin metabolism promoters, skin wound healing promoters, skin anti-aging agents, skin aging ameliorating agents, skin anti-wrinkle agents, skin barrier function improvers, moisturizers for skin, skin elasticity improvers, dull skin ameliorating agents, rough skin ameliorating agents, and whitening agents for skin, and preferably moisturizers for skin.
[4] The cell activator according to any of [1] to [3], wherein the cell activator is a cosmetic product.
[5] The cell activator according to any of [1] to [3], wherein the cell activator is a pharmaceutical product or a quasi-drug.
[6] The cell activator according to any of [1] to [5], wherein the cell activator is a topical preparation.
[7] The cell activator according to [1] or [2], wherein the cell activator is a reagent.
[8] The cell activator according to [7], wherein the cell activator is a reagent for cell culture or tissue culture.
[9] A method for culturing an animal cell or animal tissue, the method comprising a step of adding the cell activator according to claim [8] to a cultured cell or cultured tissue.
[10] A method for activating an animal cell, the method comprising administering 3H-imidazo[4,5-d][1,2,3]triazine-4,6(5H,7H)-dione to a subject.
[11] The method according to [10], wherein the method is a method for activating a skin cell.
[12] A method for promoting skin metabolism, a method for promoting skin wound healing, a method for preventing skin aging, a method for ameliorating skin aging, a method for preventing skin wrinkles, a method for improving a skin barrier function, a method for moisturizing skin, a method for improving skin elasticity, a method for ameliorating dull skin, a method for ameliorating rough skin, or a method for whitening skin, preferably a method for moisturizing skin, the method comprising administering 3H-imidazo[4,5-d][1,2,3]triazine-4,6(5H,7H)-dione to a subject.

[13] Use of 3H-imidazo[4,5-d][1,2,3]triazine-4,6(5H,7H)-dione in the manufacture of a cell activator of an animal cell.

[14] The use according to [13], wherein the animal cell is a skin cell.

[15] Use of 3H-imidazo[4,5-d][1,2,3]triazine-4,6(5H,7H)-dione in manufacturing at least one selected from the group consisting of skin metabolism promoters, skin wound healing promoters, skin anti-aging agents, skin aging ameliorating agents, skin anti-wrinkle agents, skin barrier function improvers, moisturizers for skin, skin elasticity improvers, dull skin ameliorating agents, rough skin ameliorating agents, and whitening agents for skin, preferably moisturizers for skin.

[16] 3H-Imidazo[4,5-d][1,2,3]triazine-4,6(5H,7H)-dione for use in a method for activating an animal cell.

[17] 3H-Imidazo[4,5-d][1,2,3]triazine-4,6(5H,7H)-dione according to [16], wherein the animal cell is a skin cell.

[18] 3H-Imidazo[4,5-d][1,2,3]triazine-4,6(5H,7H)-dione for use in a method for promoting skin metabolism, a method for promoting skin wound healing, a method for preventing skin aging, a method for ameliorating skin aging, a method for preventing skin wrinkles, a method for improving a skin barrier function, a method for moisturizing skin, a method for improving skin elasticity, a method for ameliorating dull skin, a method for ameliorating rough skin, or a method for whitening skin, preferably a method for moisturizing skin.

Advantageous Effects of Invention

According to a cell activator of the present invention, animal cells, particularly skin cells, can be activated.

DESCRIPTION OF EMBODIMENTS (AOH)

A cell proliferation promoter of an animal cell of the present invention comprises AOH, that is, 3H-imidazo[4,5-d][1,2,3]triazine-4,6(5H,7H)-dione (alternative term: 2-aza-8-oxo-hypoxanthine). AOH is a compound represented by Formula (I).

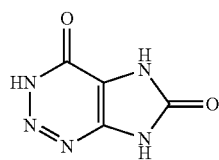

(I)

AOH is a compound known to have a plant growth regulation action (PCT International Publication No. WO2012/147750, hereinafter referred to as "Reference 1"). AOH can be manufactured by a method disclosed in Reference 1, for example. Specifically, it is possible to obtain AOH by causing xanthine oxidase to act on 7H-imidazo[4,5-d][1,2,3]triazin-4(3H)-one (alternative term: 2-azahypoxanthine, hereinafter, sometimes referred to as "AHX") which is a plant hormone that is a precursor substance of AOH. Furthermore, AOH can be obtained by applying AHX to a plant and isolating AOH produced as an AHX metabolite from the plant body.

(Animal Cells)

Cells targeted by the cell activator of the present invention are animal cells. The cell activator of the present invention is preferably applied directly to living animals. Examples of the target animal include humans and mammals other than humans, and humans are preferable. Examples of the mammals other than humans include mice, rats, guinea pigs, hamsters, rabbits, cats, dogs, sheep, pigs, cattle, horses, goats, and monkeys.

Examples of tissues or organs in which animal cells are present include skin, muscles, bones, joints, fat, brain, spinal cord, digestive organs, reproductive organs, endocrine organs, respiratory organs, circulatory system, immune system, bones, joints, and adipose tissue, and among these, skin is preferable. The effect of the cell activator of the present invention is exhibited particularly with respect to skin cells. Examples of the skin cells include cells constituting the epidermis and dermis, and among these, cells constituting the epidermis are preferable. Examples of the cells constituting the epidermis include epidermal keratinocytes (keratinocytes), pigment cells (melanocytes), Langerhans cells, and Merkel cells, and among these, epidermal keratinocytes are preferable. The cells constituting the epidermis are preferably cells present in the stratum basale, the stratum spinosum, the stratum granulosum, or the stratum corneum of the epidermis.

Examples of the cells constituting the dermis include fibroblasts, macrophages, mast cells, plasma cells, and dermal dendritic cells, and among these, fibroblasts are preferable. The cells constituting the dermis are preferably cells present in the papillary layer or the reticular layer of the dermis.

When the cell activator of the present invention is applied to the skin, the cell activator can be applied to any surface of the body, including the scalp, face (forehead, cheeks, lips, nose, ears), neck, shoulders, back, chest, abdomen, genitals, arms, hands, lower limbs, feet, nails, and hair as application sites, for example.

(Action, Function, Usage Application of Cell Activator)

The cell activator of the present invention has a cell activating action due to the presence of AOH. That is, an active ingredient of the cell activator of the present invention is AOH. Specific examples of the cell activating action of the cell activator of the present invention include a cell proliferation action and an action of enhancing expression of various genes. Meanwhile, the cell activator of the present invention has low cytotoxicity. Accordingly, the cell activator of the present invention is highly safe and is also suitable for application to a biological body.

When applied to the animal skin, the cell activator of the present invention acts on cells constituting the epidermis and/or dermis, and shows the cell proliferation action and the action of enhancing expression of various genes. When the cell activator of the present invention is applied to the skin, genes related to a cell-to-cell adhesion function, a barrier function, a stratum corneum exfoliation function, a differentiation function, a moisturizing function, and a whitening function are included in a gene group in which expression is enhanced. Accordingly, the cell activator of the present invention can be used for usage applications such as promoting skin metabolism, promoting skin wound healing, preventing skin aging, ameliorating skin aging, preventing skin wrinkles, improving a skin barrier function, moisturizing skin, improving skin elasticity, ameliorating dull skin, ameliorating rough skin, and whitening skin. That is, the cell activator of the present invention can be used as at least one selected from the group consisting of skin metabolism promoters, skin wound healing promoters, skin anti-aging agents, skin aging ameliorating agents, skin anti-wrinkle agents, skin barrier function improvers, skin moisturizers, skin elasticity improvers, dull skin ameliorating agents, rough skin ameliorating agents, and whitening agents for skin.

The form of the cell activator of the present invention is not particularly limited, and may be any form such as a solid, a liquid (solution or suspension), an emulsified form such as an emulsion and cream, a paste, a gel, and a mousse. The cell activator of the present invention can be used as a cosmetic product, a pharmaceutical product, or a quasi-drug.

(Pharmaceutical Product)

The dosage form of the cell activator as a pharmaceutical product is not particularly limited, and examples thereof include aerosols, liquid medications, suspensions, emulsions, creams, ointments, gels, liniments, lotions, poultices, tapes, eye drops, nasal drops, ear drops, suppositories, elixirs, capsules, granules, pills, powder medications, tablets, syrups, injections, and troches. When used as a pharmaceutical product for skin, a topical preparation is preferable. In the case of the topical preparation, AOH acts directly on the cells of the skin, and a stronger effect can be exhibited. The topical preparation is preferably a dosage form such as aerosols, liquid medications, suspensions, emulsions, creams, ointments, gels, liniments, lotions, poultices, and tapes.

(Quasi-Drug and Cosmetic Product)

The form of the cell activator as a quasi-drug or a cosmetic product is not particularly limited, and examples thereof include basic cosmetic preparations such as toners, lotions, creams, gels, serums, sunscreen cosmetic preparations, face masks, hand creams, foot creams, body lotions, and body creams; cleansing cosmetic preparations such as facial cleansers, makeup removers, soaps, body cleansers, shampoos, conditioners, and nail polish removers; makeup cosmetic preparations such as foundations, face primers, lip balms, lipsticks, blushes, eyeshadows, eyebrows, nail polishes, and hair dyes; antiperspirants; bath soaks; perfumes; and foods and drinks such as nutritionally functional foods, foods with function claims, foods for specified health uses, and foods for special purposes. When used as a quasi-drug or cosmetic product for the skin, a topical preparation is preferable as in the case of the pharmaceutical product. In the case of the topical preparation, AOH acts directly on the cells of the skin, and a stronger effect can be exhibited. The quasi-drug or the cosmetic product as a topical preparation is preferably a quasi-drug and a cosmetic product in the form excluding foods and drinks among the above-mentioned examples.

(Base, Carrier, Additive)

The cell activator of the present invention may comprise a base or carrier, which is commonly used in cosmetic products, pharmaceutical products, or quasi-drugs, and various additives as necessary. Examples of the additives include excipients, oiling agent, powders, buffer materials, solubilization agents, antioxidants, surfactants, thickeners, preservatives, pH adjusters, chelating agents, stabilizers, irritation-alleviating agents, antiseptics, pigments, colorants, fragrances, gloss-imparting agents, gelling agents, alcohols, water-soluble polymers, film-forming agents, resins, and keratolytics. For the base, carrier, and various additives, one kind or a plurality of kinds in combination can be used as necessary.

(Other Active Ingredients)

The cell activator of the present invention may comprise an active ingredient other than AOH in the range not impairing the effects as the cell activator. Specific examples of the active ingredient other than AOH include moisturizing ingredients, anti-inflammatory ingredients, antibacterial ingredients, cell activating ingredients, anti-aging ingredients, blood circulation promoting ingredients, ultraviolet ray protection ingredients, whitening ingredients, vitamins, proteins, peptides, amino acids, and alcohols. For these active ingredients, one kind or a plurality of kinds in combination can be used as necessary.

The cell activator of the present invention can be manufactured by a method well known to those skilled in the art by blending AOH and, as necessary, other ingredients described above. Furthermore, the concentration and content of AOH comprised in the cell activator of the present invention can be appropriately set by those skilled in the art according to the administration subject, dosage form, usage application, target effect, and the like of the cell activator. For example, the cell activator of the present invention may contain 0.0001% to 5% by mass, preferably 0.001% to 1% by mass, and more preferably 0.01% to 0.5% by mass of AOH. Furthermore, the number of administrations, dose, and administration method of the cell activator of the present invention can also be appropriately set by those skilled in the art according to the administration subject, dosage form, usage application, target effect, and the like of the cell activator. However, when the subject of the cell activator of the present invention is skin cells, as the administration method, it is preferable to perform administration on the skin by application to the skin, attachment to the skin, and the like.

As described above, the cell activator of the present invention may be used as a cosmetic product, pharmaceutical product, or quasi-drug having a cell activating action by itself, and may be added to a cosmetic, pharmaceutical product, or quasi-drug for the purpose of adding the function of the cell activator of the present invention. That is, the cell activator of the present invention can also be used as a raw material for cosmetic products, pharmaceutical products, or quasi-drugs. For example, the cell activator of the present invention may be blended into a topical preparation to be applied directly to the skin, for example, an insect repellent.

Furthermore, the cell activator of the present invention may be a reagent. Since the cell activator of the present invention can effectively activate animal cells, it can be used as a reagent for experiments or studies in which animal cells are used. Such experiments or studies may be in vitro or in vivo experiments or studies.

Examples of the reagent for such experiments or studies include reagents for cell culture or reagents for tissue culture. Examples of cells targeted by the reagents for cell culture include the same animal cells described above. Furthermore, examples of tissues or organs targeted by the reagents for tissue culture include the same tissues or organs in which animal cells are present as described above.

For example, the cell activator of the present invention can be applied directly to living animals as described above, or in vitro application to cells isolated from animals or cultured cells derived from animals is also possible. Such cells may be fusion cells of normal cells, cancer cells, stein cells, hybridomas, and the like. These cells can be activated by the cell proliferation action and the action of enhancing gene expression of the cell activator of the present invention.

The present invention also provides a method for culturing an animal cell or animal tissue, the method comprising a step of adding the above-mentioned cell activator to cultured cells or cultured tissue. By adding the cell activator of the present invention to cells or tissue during culturing, the cultured cells or cultured tissue can be efficiently activated by the cell proliferation action and the action of enhancing gene expression. Examples of the cultured cells or cultured tissue include the same cells, tissues, and organs as described above. The culture conditions, timing of adding the cell activator, addition amount, and the like can be appropriately determined by those skilled in the art.

EXAMPLES

Example 1. Skin Irritation Test

A skin irritation test was performed in accordance with OECD Test Guidelines (No. 439), and SKINETHIC SKIN IRRITATION TEST, which is a TEST METHOD FOR THE PREDICTION OF ACUTE SKIN IRRITATION OF CHEMICALS and is a protocol published by the European Centre for the Validation of Alternative Methods (ECVAM). This skin irritation test is a test using a reconstructed human epidermis (RhE) model (which uses non-transformed epidermal keratinocytes derived from humans as a cell source and is composed of structured stratum basale, stratum spinosum, stratum granulosum, and stratum corneum) which was designed to closely resemble biochemical and physiological characteristics of human epidermis to obtain the cell viability of the RhE model to which a test substance was locally applied as an index of skin irritation of the test substance. The cell viability of the RhE model was measured by an MTT method. In the MTT method, the cell viability is measured by quantitatively determining blue formazan utilizing a property that MTT (3-(4,5-dimethylthiazol-2-yl)-2,5-diphenyltetrazolium bromide, thiazolyl blue), which is a vital staining dye, is reduced to blue formazan by enzymatic reaction of viable cells. When the cell viability of the RhE model is higher than a predetermined value, the applied test substance can be judged to be non-irritating.

The SkinEthic™-RHE was incubated in a growth medium for 24 hours and transferred to a maintenance medium. 10 µL of sterile purified water was added dropwise from the epidermis side and homogenized, and thereafter 16 mg of a test sample was added from above.

In addition, PBS (−) was used as a negative (non-irritating) control and a 5% SDS aqueous solution was used as a positive (irritating) control, 16 µL of each thereof was exposed from the epidermis side, and a nylon membrane was applied from above.

After exposing the test sample for 42 minutes, the test sample was immediately removed from the epidermis model by a washing operation and cultured in fresh growth medium for an additional 42 hours. After culturing, the epidermis model was transferred to a maintenance medium comprising 1.0 mg/mL of MTT and cultured for 3 hours. Thereafter, the epidermis model was immersed in isopropanol for 2 hours to extract blue formazan in the epidermis model, and the absorbance at 570 nm of the extraction liquid was measured with a microplate reader. The same treatment was performed on the epidermis model exposed to the negative control and the positive control to measure the absorbance.

Results

The cell viability was represented as a percentage of the absorbance of the skin model exposed to the test sample with respect to the absorbance of the skin model exposed to the negative control. The results show that the cell viability of the skin model treated with 5% SDS as the positive control was 1.2%, and the cell viability of the skin model treated with AOH was 100%, with the cell viability of the skin model treated with PBS (−) as the negative control as 100%. Accordingly, AOH was determined to be non-irritating.

Example 2. Action of Activating Epidermal Cells

Normal human epidermal keratinocytes were seeded on 96-well plates at the density of $5.0 \times 10^3$ cells/well using a HuMedia KG2 medium (KG2). 24 hours after seeding, the above-mentioned medium was replaced with a HuMedia KB2 medium (KB2) comprising the test sample. AOH and AHX (2-azahypoxanthine) were used as test samples, KG2 as a positive control (P. C.) for the cell activating action was treated instead of the test sample, and cells which were not treated with the samples were used as a negative control. After culturing for 48 hours, the above-mentioned medium was replaced with KB2 comprising 0.2 mg/mL of MTT to perform culturing for 1 hour. After removing the medium, the absorbance at 550 nm and 650 nm of the cell lysate in which 2-propanol was added to lyse the cells was measured. The amount of MTT reduced to blue formazan was obtained by subtracting the absorbance at 650 nm, which was derived from the cell turbidity, from the absorbance at 550 nm. The action of activating epidermal keratinocytes was shown as Index (%), which is a percentage of the absorbance of the cells, which was treated with the test samples, to the absorbance of the cells, which was not treated with the samples (negative control), with the amount of MTT reduced as an index.

Results

The test results are shown in Table 1. In Table 1, AOH-treated cells showed a significant increase in Index at the concentrations of 7.8 to 31.3 µg/mL, suggesting that viable cells proliferate. On the other hand, AHX-treated cells did not have a proliferative effect as in the case of the AOH-treated cells and were significantly reduced at the concentration of 31.3 µg/mL or more, and the rate of decrease in Index was also larger than that of the AOH-treated cells. From these results, it was clarified that AOH has lower cytotoxicity than AHX and has the cell activating action.

TABLE 1

| Test sample | Sample concentration (µg/mL) | Index (%) Mean ± S.D. | P (* < 0.05) |
|---|---|---|---|
| AOH | 0.0 | 100 ± 2.7 | |
| | P.C. | 118.6 ± 1.7 | * |
| | 3.9 | 105.7 ± 4.5 | |
| | 7.8 | 108.4 ± 4 | * |
| | 15.6 | 108.7 ± 5.6 | * |
| | 31.3 | 109.7 ± 5.2 | * |
| | 62.5 | 102.3 ± 2.8 | |
| | 125 | 98.6 ± 0.7 | |
| | 250 | 94.2 ± 1.7 | * |
| | 500 | 91.9 ± 0.9 | * |
| AHX | 0 | 100 ± 5.2 | |
| | P.C. | 120.6 ± 1.9 | * |
| | 3.9 | 100.6 ± 3 | |
| | 7.8 | 96.1 ± 2.7 | |
| | 15.6 | 94 ± 5.9 | |
| | 31.3 | 87.1 ± 4.5 | * |
| | 62.5 | 80.2 ± 1.8 | * |
| | 125 | 77.4 ± 2 | * |
| | 250 | 78.4 ± 1.8 | * |
| | 500 | 74.2 ± 1.9 | * |

Example 3. Microarray Test

Since it was recognized from Examples 1 and 2 that unlike AHX, AOH was less toxic to cells and rather had the effect of promoting cell proliferation, factors promoting cell proliferation was verified by microarray in Example 3.

Normal human epidermal keratinocytes were seeded on 6-well plates at the cell density of $1.5 \times 10^5$ cells/well using a HuMedia-KG2 medium. After culturing for 24 hours, the medium was replaced with 3 mL of a HuMedia-KB2 medium comprising AOH at the concentration of 0, 30, 100, and 300 μg/mL. After the replacement, culturing was performed for 24 hours, and the cells were immersed in a QIAzol reagent and lysed. RNA purified using an miRNeasy Mini Kit (QIAGEN) was recovered from the lysate, and a DNA microarray was performed using an mRNA expression analysis chip (DNA Chip Genopal (registered trademark)). The obtained results were analyzed to represent the expression of various genes as a ratio with a correction value of the control as 1, and a significant difference test was performed using the Student's t-test (significance level p of 5%).

Results

Table 2 shows typical ones which showed a change in gene expression in the analysis results of microarray. In Table 2, it can be determined that when the value is larger than 1, gene expression is increased, and when the p value is smaller than 0.05, there is a significant change with respect to the control (indicated by * in the table). AOH treatment varied the expression of some genes in a concentration-dependent manner. A significant increase in gene expression of claudin 1 (CLDN1), desmocollin 1 (DSC1), desmoglein 1 (DSG1), and E-cadherin (CDH1) involved in cell-to-cell adhesion and barrier functions is shown.

In addition, a significant increase in gene expression of proteases kallikrein 5 (KLK5) and kallikrein 7 (KLK7), which are involved in stratum corneum exfoliation, and a serine protease inhibitor (SPIMK5) which is a regulator thereof is shown.

In addition, a significant increase in gene expression of keratin 1 (KRT1), keratin 10 (KRT10), transglutaminase 1 (TGM1), and involucrin (IVL), which are general differentiation indexes, and SPRR1B, which is a cornified envelope (corneocyte membrane) constituent protein, is shown.

In addition, a significant increase in gene expression of a hyaluronan synthase (HAS3) was confirmed.

In a gene group related to extracellular matrix, a slight increase in gene expression of fibronectin (FN1) was recognized.

From these results, it was suggested that there is a possibility that AOH treatment on cells acts on a wide range of epidermal function such as promoting turnover of the epidermis, promoting differentiation and maturation, promoting metabolism of old keratin, and enhancing a moisturizing action.

A significant decrease was shown in gene expression of prostaglandin E synthetase (PTGES) and cyclooxygenase (PTGS2), which are gene groups that induce melanin production, whereas a significant increase was shown in an endothelin 1 (EDN1) gene. From these results, it was suggested that there is a possibility that it is also effective for a whitening action.

TABLE 2

| | | | | | | | | | | |
|---|---|---|---|---|---|---|---|---|---|---|
| Results of gene expression analysis by microarray | | | | | | | | | | |
| | Function: action | | | Untreated | | | 30 μg/mL | | | 100 μg/mL |
| Function: group | (name) | Gene | | Average | S.D. | p | Average | S.D. | p | Average |
| Cell-to-cell adhesion and barrier functions | Tight junction (claudin 1) | CLDN1 | | 1.00 | 0.12 | 1.000 | 1.19 | 0.08 | 0.090 | 1.49 |
| | Tight junction (desmocollin 1) | DSC1 | | 1.00 | 0.06 | 1.000 | 1.26 | 0.23 | 0.177 | 1.28 |
| | Tight junction (desmoglein 1) | DSG1 | | 1.00 | 0.02 | 1.000 | 1.09 | 0.14 | 0.363 | 1.13 |
| | Cell adhesion factor (E-cadherin) | CDH1 | | 1.00 | 0.07 | 1.000 | 1.11 | 0.08 | 0.152 | 1.09 |
| Related to stratum corneum and differentiation protease (barrier function) | Stratum corneum exfoliation protease (kallikrein 5) | KLK5 | | 1.00 | 0.02 | 1.000 | 1.11 | 0.07 | 0.087 | 1.16 |
| | Stratum corneum exfoliation protease (kallikrein 7) | KLK7 | | 1.00 | 0.08 | 1.000 | 1.12 | 0.21 | 0.430 | 1.24 |
| | Stratum corneum exfoliation protease inhibition (serine protease inhibitor) | SPINK5 (LEKTI1) | | 1.00 | 0.04 | 1.000 | 1.15 | 0.14 | 0.197 | 1.28 |
| Related to epidermis differentiation (epidermis function, moisturization, and the like) | Differentiation (keratin 1) | KRT1 | | 1.00 | 0.04 | 1.000 | 1.46 | 0.16 | 0.033* | 1.60 |
| | Differentiation (keratin 10) | KRT10 | | 1.00 | 0.03 | 1.000 | 1.19 | 0.07 | 0.034* | 1.33 |
| | Differentiation enzyme (transglutaminase 1) | TGM1 | | 1.00 | 0.10 | 1.000 | 1.16 | 0.14 | 0.173 | 1.29 |
| | Cornified envelope constituent protein (involucrin) | IVL | | 1.00 | 0.04 | 1.000 | 1.35 | 0.16 | 0.055 | 1.49 |
| | Cornified envelope constituent protein | SPRR1B | | 1.00 | 0.04 | 1.000 | 1.27 | 0.05 | 0.003* | 1.42 |

TABLE 2-continued

Results of gene expression analysis by microarray

| Function: group | Function: action (name) | Gene | | | | | | | |
|---|---|---|---|---|---|---|---|---|---|
| Whitening-related factor | PGE2 synthetase (prostaglandin E synthetase) | PTGES | 1.00 | 0.06 | 1.000 | 0.77 | 0.06 | 0.008* | 0.79 |
| | Enzyme (cyclooxygenase 2) | PTGS2 (COX-2) | 1.00 | 0.06 | 1.000 | 0.90 | 0.03 | 0.065 | 0.93 |
| | Vasoconstrictor (endothelin 1) | EDN1 | 1.00 | 0.04 | 1.000 | 1.24 | 0.05 | 0.004* | 1.39 |
| Biosynthesis of hyaluronic acid | Hyaluronan synthase | HAS3 | 1.00 | 0.11 | 1.000 | 1.09 | 0.19 | 0.510 | 1.27 |
| Basement membrane extra cellular matrix | Matrix constituent protein (fibronectin) | FN1 | 1.00 | 0.08 | 1.000 | 1.12 | 0.04 | 0.106 | 1.15 |
| Internal standard | Positive control | ATP5F1 | 1.00 | 0.03 | 1.000 | 1.00 | 0.03 | 0.967 | 1.02 |
| | Positive control | GUSB | 1.00 | 0.03 | 1.000 | 0.97 | 0.07 | 0.545 | 1.00 |
| | Positive control | RPLPO | 1.00 | 0.08 | 1.000 | 1.03 | 0.06 | 0.608 | 1.06 |
| | Positive control | PPIA (Cyclophilin) | 1.00 | 0.02 | 1.000 | 0.98 | 0.03 | 0.451 | 0.96 |

| | | | | 100 μg/mL | | 300 μg/mL | | |
|---|---|---|---|---|---|---|---|---|
| Function: group | Function: action (name) | Gene | | S.D. | p | Average | S.D. | p |
| Cell-to-cell adhesion and barrier functions | Tight junction (claudin 1) | CLDN1 | | 0.07 | 0.006* | 1.43 | 0.18 | 0.031* |
| | Tight junction (desmocollin 1) | DSC1 | | 0.01 | 0.012* | 1.59 | 0.09 | 0.001* |
| | Tight junction (desmoglein 1) | DSG1 | | 0.04 | 0.020* | 1.15 | 0.01 | 0.000* |
| | Cell adhesion factor (E-cadherin) | CDH1 | | 0.04 | 0.130 | 1.16 | 0.03 | 0.038* |
| Related to stratum corneum and differentiation protease (barrier function) | Stratum corneum exfoliation protease (kallikrein 5) | KLK5 | | 0.02 | 0.001* | 1.24 | 0.06 | 0.013* |
| | Stratum corneum exfoliation protease (kallikrein 7) | KLK7 | | 0.05 | 0.016* | 1.17 | 0.07 | 0.045* |
| | Stratum corneum exfoliation protease inhibition (serine protease inhibitor) | SPINK5 (LEKTI1) | | 0.03 | 0.002* | 1.38 | 0.07 | 0.003* |
| Related to epidermis differentiation (epidermis function, moisturization, and the like) | Differentiation (keratin 1) | KRT1 | | 0.11 | 0.006* | 2.07 | 0.25 | 0.016* |
| | Differentiation (keratin 10) | KRT10 | | 0.08 | 0.010* | 1.44 | 0.14 | 0.029* |
| | Differentiation enzyme (transglutaminase 1) | TGM1 | | 0.05 | 0.019* | 1.57 | 0.08 | 0.002* |
| | Cornified envelope constituent protein (involucrin) | IVL | | 0.03 | 0.000* | 1.75 | 0.11 | 0.004* |
| | Cornified envelope constituent protein | SPRR1B | | 0.05 | 0.000* | 1.60 | 0.14 | 0.012* |
| Whitening-related factor | PGE2 synthetase (prostaglandin E synthetase) | PTGES | | 0.03 | 0.010* | 0.56 | 0.01 | 0.004* |
| | Enzyme (cyclooxygenase 2) | PTGS2 (COX-2) | | 0.03 | 0.140 | 0.79 | 0.03 | 0.010* |
| | Vasoconstrictor (endothelin 1) | EDN1 | | 0.08 | 0.006* | 1.75 | 0.07 | 0.000* |
| Biosynthesis of hyaluronic acid | Hyaluronan synthase | HAS3 | | 0.08 | 0.030* | 1.60 | 0.13 | 0.004* |
| Basement membrane extra cellular matrix | Matrix constituent protein (fibronectin) | FN1 | | 0.04 | 0.068 | 1.22 | 0.07 | 0.025* |
| Internal standard | Positive control | ATP5F1 | | 0.02 | 0.437 | 1.01 | 0.05 | 0.779 |
| | Positive control | GUSB | | 0.02 | 0.854 | 0.97 | 0.01 | 0.181 |
| | Positive control | RPLPO | | 0.10 | 0.461 | 1.08 | 0.08 | 0.304 |
| | Positive control | PPIA (Cyclophilin) | | 0.01 | 0.061 | 0.99 | 0.03 | 0.679 |

Example 4. Production of Toners

With the composition shown in Table 3, a toner was produced as follows.

TABLE 3

|  | Raw material | Mass % |
|---|---|---|
| Component A | AOH | 0.1 |
|  | Water | 60 |
| Component B | Paraben | 0.2 |
|  | Xanthan gum | 0.2 |
|  | Butylene glycol | 5 |
|  | PEG-60 hydrogenated castor oil | 0.2 |
| Component C | Water | 34.3 |

The raw material of a component A in Table 3 was mixed and dissolved. The raw materials of a component B were mixed, heated, dispersed, and added to a component C. The component C to which the component B was added, and the component A were mixed to produce a toner.

When this toner was applied to the face and scalp, the skin was moisturized without an irritation sensation.

Example 5. Test of Long-Term Continuous Use

A test of long-term continuous use (double blind test) was performed using a toner (toner B) comprising 0.1% by weight of AOH of Example 4 and a placebo toner (toner A) having the same composition as that of the toner of Example 4 except that AOH was not comprised to perform evaluation of the water content of keratin and the transepidermal water loss (TEWL). 22 test subjects (females, average age 48.4±4.68 years old) were asked to apply the toner A on the half face and the toner B on the other half face after washing their faces twice in the morning and evening, and this was continued for 8 weeks. The water content of keratin and the TEWL were measured at the start of the test, after 4 weeks, and after 8 weeks. The water content of stratum corneum and the TEWL on the left and right cheek portions of the test subjects were measured using each of SKICON-200EX (Yayoi Co., Ltd.) and Cyclone Moisture Evaporator AS-CT1 (ASCH Japan Co., Ltd.). Analysis of test results was performed on 20 subjects as effective test subjects excluding 2 test subjects whose left-right difference in the water content of keratin at the start of the test was 150 μS or more.

Table 4 shows the average values of the relative values after 4 weeks and 8 weeks, with the water content of keratin and TEWL before the start of use as 100.

TABLE 4

|  | Placebo toner | Toner comprising AOH |
|---|---|---|
| Water content of keratin after 4 weeks | 138.8 | 154.9 |
| Water content of keratin after 8 weeks | 114.4 | 134.3 |
| TEWL after 4 weeks | 121.5 | 110.8 |
| TEWL after 8 weeks | 93.2 | 85.6 |

As a result of statistical analysis by the paired t-test, the water content of keratin after 4 weeks was significantly increased in the group to which the toner comprising AOH was applied as compared to the water content of keratin before the start of use ($p<0.05$), whereas the TEWL after 8 weeks was significantly reduced in the group to which the toner comprising AOH was applied as compared to the TEWL before the start of use ($p<0.05$). From these results, it was confirmed that AOH has the moisturizing effect on the skin.

Example 6. Safety Test

When the following safety tests were performed on AOH, toxicity was not recognized in any of tests.
Mutagenicity test (Ames test) (OECD TG471)
In vitro skin sensitization test (DPRA method) (OECD TG442C)
In vitro phototoxicity test (OECD TG432)
Human patch test

The invention claimed is:

1. A method for activating a human epidermal keratinocyte, the method comprising topically applying a composition that includes 3H-imidazo[4,5-d][1,2,3]triazine-4,6(5H,7H)-dione to skin of a human subject, wherein the activating is enhancing expression of at least one gene involved in one epidermal function selected from the group consisting of promoting cell-to-cell adhesion and barrier functions, stratum corneum exfoliation function, promoting differentiation and maturation, enhancing moisturizing action, and whitening, wherein the at least one gene is a gene selected from the group consisting of CLDN1, DSC1, DSG1, CDH1, KLK5, KLK7, SPIMK5, KRT1, KRT10, TGM1, IVL, SPRR1B, HAS3, FN1, and EDN1, and wherein the enhancing acts on at least one epidermal function selected from the group consisting of promoting turnover of an epidermis, promoting differentiation and maturation, promoting metabolism of old keratin, and enhancing a moisturizing action.

2. The method according to claim 1, wherein the human epidermal keratinocyte is a keratinocyte presenting in a stratum basale, a stratum spinosum, a stratum granulosum, or a stratum corneum of an epidermis of the human subject.

3. A method for moisturizing skin, the method comprising topically applying a composition that includes 3H-imidazo[4,5-d][1,2,3]triazine-4,6(5H,7H)-dione to skin of a human subject.

4. A method for promoting cell proliferation of a human epidermal keratinocyte, the method comprising topically applying a composition that includes 3H-imidazo[4,5-d][1,2,3]triazine-4,6(5H,7H)-dione to skin of a human subject.

5. The method according to claim 4, wherein the human epidermal keratinocyte is a keratinocyte presenting in a stratum basale, a stratum spinosum, a stratum granulosum, or a stratum corneum of an epidermis of the human subject.

6. The method according to claim 1, wherein the human epidermal keratinocyte is a keratinocyte presenting in a stratum corneum of an epidermis of the human subject.

7. The method according to claim 3, wherein the human epidermal keratinocyte is a keratinocyte presenting in a stratum corneum of an epidermis of the human subject.

8. The method according to claim 4, wherein the human epidermal keratinocyte is a keratinocyte presenting in a stratum corneum of an epidermis of the human subject.

* * * * *